United States Patent [19]

Kishi et al.

[11] Patent Number: 5,738,950
[45] Date of Patent: Apr. 14, 1998

[54] MAGNETOOPTICAL RECORDING MEDIUM

[75] Inventors: Hiroyoshi Kishi, Tokyo; Masaaki Matsushima, Machida, both of Japan

[73] Assignee: Canon Kabushiki Kaisha, Tokyo, Japan

[21] Appl. No.: 485,159

[22] Filed: Jun. 7, 1995

Related U.S. Application Data

[63] Continuation of Ser. No. 820,828, Jan. 21, 1986, abandoned, which is a continuation of Ser. No. 491,300, May 3, 1983, abandoned.

[30] Foreign Application Priority Data

| May 10, 1982 | [JP] | Japan | ................................. 57-77677 |
| Mar. 16, 1983 | [JP] | Japan | ................................. 58-45035 |

[51] Int. Cl.$^6$ ........................................ G11B 5/66
[52] U.S. Cl. .................. 428/694 ML; 428/694 SC; 428/694 MT; 428/694 RE; 428/900; 369/283
[58] Field of Search ............... 428/694 ML, 694 SC, 428/694 MT, 694 RE, 900; 369/283

[56] References Cited

U.S. PATENT DOCUMENTS

| 3,949,387 | 4/1976 | Chaudhari et al. | 365/122 |
| 3,965,463 | 6/1976 | Chaudhari et al. | 365/34 |
| 4,126,494 | 11/1978 | Imamura et al. | 148/301 |
| 4,152,486 | 5/1979 | Imamura et al. | 428/606 |
| 4,438,508 | 3/1984 | Urner-Willie et al. | 365/122 |
| 4,464,437 | 8/1984 | Urner-Wille et al. | 428/458 |
| 4,693,943 | 9/1987 | Kishi et al. | 428/678 |

FOREIGN PATENT DOCUMENTS

| 2163607 | 11/1975 | Germany . | |
| 2911992 | 12/1981 | Germany | G11C 13/06 |
| 3335689 | 4/1984 | Germany | G11C 13/06 |
| 49-47043 | 5/1974 | Japan . | |
| 31703 | 3/1977 | Japan . | |
| 56-74843 | 6/1981 | Japan . | |
| 74843 | 6/1981 | Japan . | |
| 56-37607 | 9/1981 | Japan . | |
| 56-126907 | 10/1981 | Japan . | |
| 56-143547 | 11/1981 | Japan . | |
| 7713503 | 6/1979 | Netherlands | G02F 1/00 |
| 2049730 | 12/1980 | United Kingdom | C22C 38/00 |
| 2071696 | 9/1981 | United Kingdom . | |
| 2077065 | 12/1981 | United Kingdom . | |

OTHER PUBLICATIONS

Taylor et al "Magnetic Anbotropy in Evaporated Amorphous Films of the ternary system $Gd_x$ ($Fe_{1-y}$ $Co_y$)$_{1-x}$," J. Appl. Phys., vol. 48, No. 1 (1977) pp. 358–361.

Luborsky, F.E. et al., "Potential of Amorphous Alloys for Application in Magnetic Devices," J. Appl. Phys., 49(3), pp. 1769–1774 (Mar. 1978).

Sander, I., et al., "Digital magneto–optical recorder," SPIE, vol. 382, pp. 240–244 (Incline Village, Nev., Jan. 17–20, 1983).

Neumüller, Dr. Otto–Albrecht, "Römpps Chemie–Lexikon," Franckh'sche Verlagshandlung, Stuttgart, pp. 3717–3718 (with translation).

American Institute of Physics Conference Proceedings No. 24: Magnetism and Magnetic Materials–1974; Lee et al.; pp. 108–109; 1975.

Physical Review B Condensed Matter; vol. 22, No. 3; Taylor, et al.; pp. 1320–1326; Aug. 1, 1980.

Translation of Official Letter from German Patent Office Oct. 23, 1992.

Paper prepared for the 11th Research Conference of Japan Applied Magnetic Society; 11-4; Imamura; pp. 21–25, 1979 (With translation).

Digests of the 5th Annual Conference on MAGNETICS in Japan 1981; Tsunashima, et al.; p. 146; Oct. 20, 1981 (With translation).

*Primary Examiner*—Leszek Kiliman
*Attorney, Agent, or Firm*—Fitzpatrick, Cella, Harper & Scinto

[57] ABSTRACT

A magnetooptical recording medium is constituted of a quaternary amorphous magnetic alloy of Gd—Tb—Fe—Co.

2 Claims, 1 Drawing Sheet

MAGNETOOPTICAL RECORDING MEDIUM

This application is a continuation of application Ser. No. 06/820,828 filed Jan. 21, 1986, which is a continuation of application Ser. No. 06/491,300 filed May 3, 1983, both now abandoned.

BACKGROUND OF THE INVENTION

1. Field of the Invention

This invention relates to a magnetooptical recording medium which may be used for optomagnetic memory, magnetic recording and display elements, and more particularly, to a magnetic thin film recording medium capable of being read by the magnetooptical effect.

2. Description of the Prior Art

Heretofore, there have been known various magnetooptical recording medium, for example, poly-crystalline thin films such as MnBi, MnCuBi and the like, amorphous thin films such as GdCo, GdFe, TbFe, DyFe, GdTbFe, TbDyFe and the like, and single crystalline thin films such as GIG and the like.

Among these thin films the amorphous thin films have been recently regarded as excellent magnetooptical recording mediums since the thin films of a large area can be produced at about room temperature, signals can be written with a small light-thermal energy at a good writing efficiency, and the written signals can be read out at a good S/N ratio at a high read-out efficiency.

However, these amorphous thin films suffer from various drawbacks. For example, GdFe has a small coercive force and the recorded information is not stable.

In the case of GdFe or GdCo, the writing is effected utilizing the magnetic compensation temperature and therefore, there is a drawback that the film composition should be strictly controlled upon forming the film so as to make the writing efficiency uniform.

In the case of TbFe, DyFe or TbDyFe, a Curie temperature (Tc) writing is effected, and therefore, it is not necessary to control so strictly the film composition, but there is a drawback that the Curie temperature is as low as 100° C. or less so that a light of a strong power can not be used upon reading the signal.

The lower the Curie temperature, the higher the efficiency of writing, but the signal written in is disturbed by the ambient temperature and the read-out light at a low Curie point. Therefore, the magnetic transformation temperature is preferably 100° C. or more taking the practical use situation into consideration.

The read-out S/N ratio by the reflective light is proportional to R·θk, where R is the reflectance and θk is the angle of Kerr rotation. Accordingly, in order to read-out at a good S/N ratio, the angle of Kerr rotation may be made greater. Table 1 shows angles of Kerr rotation of amorphous magnetic films.

TABLE 1

| Material | Angle of Kerr rotation (degree) |
| --- | --- |
| DyFe | 0.12 |
| TbFe | 0.18 |
| GdFe | 0.24 |
| GdCo | 0.20 |
| TbDyFe | 0.20 |

TABLE 1-continued

| Material | Angle of Kerr rotation (degree) |
| --- | --- |
| GdDyFe | 0.24 |
| GdTbFe | 0.27 |

The angle of Kerr rotation is defined as stated below. A linearly polarized light incident on a magnetooptical thin film is reflected as an elliptically polarized light. The angle of Kerr rotation is the angle formed by the polarized plane of the incident light and the plane formed with and containing major axes of the resulting elliptical polarized light.

In Table 1, the angle of Kerr rotation of GdTbFe is the greatest. But, even this value is not sufficient, and it has been studied to further make greater the angle of Kerr rotation.

On the other hand, as one of the specific feature of the aforesaid amorphous magnetic materials, typically GdTbFe, there may be mentioned poor corrosion resistance. That is, when contacted with the air or water vapor, these materials are not only lowered in magnetic characteristics but they are finally completely oxidized to become transparent.

SUMMARY OF THE INVENTION

An object of the present invention is to provide a magnetooptical recording medium which is excellent in thermal stability, sufficiently great in the angle of Kerr rotation and capable of read-out at a good S/N ratio.

Another object of the present invention is to provide a magnetooptical recording medium which is improved in corrosion resistance without impairing its magnetic characteristics.

The present invention is directed to accomplishment of the above objects by a magnetooptical recording medium comprising a quaternary amorphous magnetic alloy of Gd—Tb—Fe—Co.

BRIEF DESCRIPTION OF THE DRAWING

In FIG. 2, the ordinate shows a weight increments per unit weight of starting material.

DESCRIPTION OF THE PREFERRED EMBODIMENT

Figure 1:
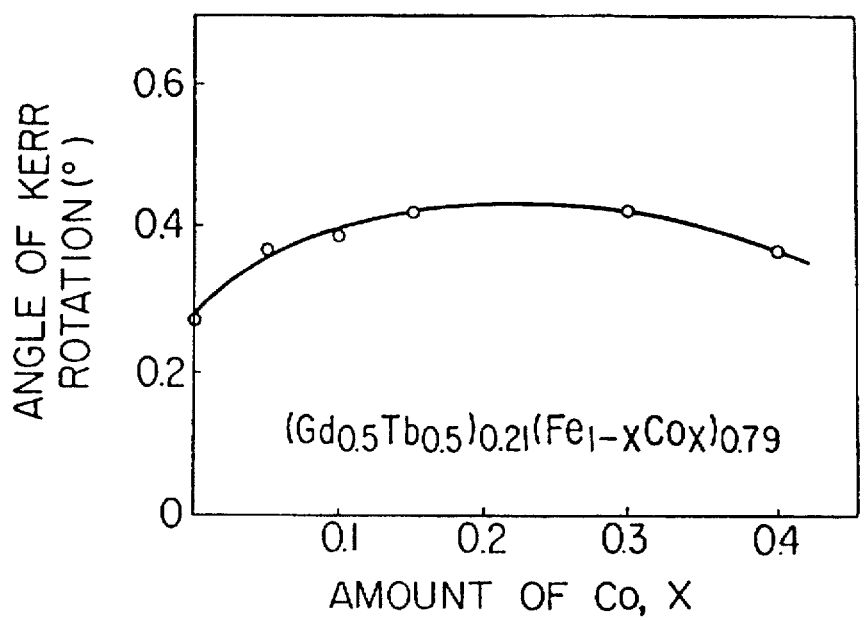
FIG. 1 shows the relation of the angle of Kerr rotation versus Co content in the Example of the present invention having a composition of $(Gd_{0.5}Tb_{0.5})_{0.21}(Fe_{1-x}Co_x)_{0.79}$.

In the magnetooptical recording medium according to the present invention, there was obtained a recording medium with a great angle of Kerr rotation by forming an amorphous magnetic medium with a combination of Gd—Tb—Fe—Co. This result, as apparently seen from the Examples as hereinafter described, possesses a value surpassing to a great extent 0.27 degree of GdTbFe which has been the greatest angle of Kerr rotation known in the art.

Also, the magnetooptical recording medium of the Gd—Tb—Fe—Co system amorphous quaternary alloy must have a sufficient magnetic anisotropy since the easy magnetizable axis is oriented in the direction perpendicular to the film surface. For this purpose, the thin film is required to be constituted of an amorphous material and this can be accomplished by forming a thin film according to the sputtering method, the vacuum vapor deposition method or the like. Also, as the composition for imparting sufficient magnetic anisotropy to orient the easy magnetizable axis in the direction perpendicular to the film surface, the atomic ratio of the sum of Fe and Co may desirably exist in the range from 50 atomic % to 90 atomic %, particularly preferably from 70 atomic % to 85 atomic % based on a total amount. Further, in the above magnetooptical recording medium according to the present invention, in order to make the angle of Kerr rotation sufficiently greater as compared with the values with the constituent elements of the prior art, Co may desirably exist at an atomic ratio of 0.5 atomic % relative to the sum of Fe and Co, when the atomic ratio of the sum of Fe and Co is made 100%.

From these conditions, desirable compositions for giving sufficient magnetic anisotropy and sufficient angle of Kerr rotation may be represented by the following formula:

$$(Gd_{1-z}Tb_z)_{1-y}(Fe_{1-x}Co_x)_y$$

wherein $0.005 \leq X < 1$, $0.5 \leq Y \leq 0.9$, $0 < Z < 1$.

EXAMPLE 1

In a high frequency sputtering device, a plate glass of 3 inch square was used as the substrate and a target having chips of Gd, Tb and Co each of 5 mm square arranged uniformly on Fe of 4 inch in diameter was employed. After evacuating the chamber to a vacuum of $1.5 \times 10^{-5}$ Pa or less, Ar gas was introduced to $4 \times 10^{-1}$ Pa, and by operating the main valve of the vacuum evacuation system, Ar pressure was increased to 3 Pa. Film formation was conducted at a sputtering power of 200 W from a high frequency power source. The thus prepared film with a thickness of 1500 Å was found to have an easy magnetizable axis in the direction perpendicular to the film surface and it was also found to be amorphous by X-ray analysis. Analysis of the composition gave the result that the magnetic film consisted of $(Gd_{0.5}Tb_{0.5})_{0.21}(Fe_{0.95}Co_{0.05})_{0.79}$, and the angle of Kerr rotation as measured by He—Ne laser at an oscillated wavelength of 633 nm was 0.37 degree, which was greater by about 30% than the value of the angle of Kerr rotation of $(Gd_{0.5}Tb_{0.5})_{0.21}Fe_{0.79}$ prepared in the same manner as described above.

EXAMPLES 2-5

Example 1 was repeated except that the amount of Co on the Fe target was varied. The compositions of Examples 2 to 5 and the angles of Kerr rotation of these Examples are given in Table 2.

TABLE 2

| Example | Composition | Angle of Kerr rotation (degree) |
|---|---|---|
| 2 | $(Gd_{0.5}Tb_{0.5})_{0.21}(Fe_{0.9}Co_{0.1})_{0.79}$ | 0.39 |
| 3 | $(Gd_{0.5}Tb_{0.5})_{0.21}(Fe_{0.85}Co_{0.15})_{0.79}$ | 0.42 |
| 4 | $(Gd_{0.5}Tb_{0.5})_{0.21}(Fe_{0.7}Co_{0.3})_{0.79}$ | 0.42 |
| 5 | $(Gd_{0.5}Tb_{0.5})_{0.21}(Fe_{0.6}Co_{0.4})_{0.79}$ | 0.37 |

FIG. 1 shows how the angle of Kerr rotation varies depending on the changes in the Co content in Examples 1 to 5, wherein the axis of ordinate indicates the angle of Kerr rotation and the axis of abscissa Co content. Thus, by varying the Co content relative to Fe, there can be obtained magnetic films having different values of the angle of Kerr rotation, and all of those angles of Kerr rotation were found to be sufficiently greater than the value of the magnetic film of the prior art.

EXAMPLES 6-12

Example 1 was repeated except that the contents of Gd, Tb and Co on the Fe target were varied. The compositions of Examples 6-12 and the angles of Kerr rotation of these Examples are shown in Table 3.

TABLE 3

| Example | Composition | Angle of Kerr rotation (degree) |
|---|---|---|
| 6 | $(Gd_{0.5}Tb_{0.5})_{0.17}(Fe_{0.9}Co_{0.1})_{0.83}$ | 0.35 |
| 7 | $(Gd_{0.5}Tb_{0.5})_{0.25}(Fe_{0.9}Co_{0.1})_{0.75}$ | 0.40 |
| 8 | $(Gd_{0.5}Tb_{0.5})_{0.29}(Fe_{0.9}Co_{0.1})_{0.71}$ | 0.35 |
| 9 | $(Gd_{0.2}Tb_{0.8})_{0.21}(Fe_{0.9}Co_{0.1})_{0.79}$ | 0.38 |
| 10 | $(Gd_{0.4}Tb_{0.6})_{0.21}(Fe_{0.9}Co_{0.1})_{0.79}$ | 0.39 |
| 11 | $(Gd_{0.6}Tb_{0.4})_{0.21}(Fe_{0.9}Co_{0.1})_{0.79}$ | 0.39 |
| 12 | $(Gd_{0.8}Tb_{0.2})_{0.21}(Fe_{0.9}Co_{0.1})_{0.79}$ | 0.38 |

The angle of Kerr rotation in Examples 6-12 were also found to be sufficiently greater as compared with the angle of Kerr rotation for the constituting of the prior art.

In the magnetooptical recording medium according to the present invention, by adding Si to the amorphous magnetic alloy GdTbFeCo as described in an amount of Si atomic ratio ranging from 0.1 atomic % to 30 atomic %, the aforesaid recording medium can be improved in corrosion resistance. The following Example is shown for the purpose of illustration of this point.

EXAMPLE 13

In a high frequency sputtering device, a plate glass of 3 inch square was used as the substrate and a first target having chips of Gd, Tb and Co each of 5 mm square arranged uniformly on Fe of 4 inch in diameter and a second target composed of Si of 4 inch in diameter were employed. After evacuating the chamber to a vacuum of $1.5 \times 10^{-5}$ Pa or less, Ar gas was introduced to $4-10^{-1}$ Pa, and by operating the main valve of the vacuum evacuation system, Ar pressure was increased to 3 Pa. From a high frequency source, the sputtering power on the first target was made constant at 250 W, while the sputtering power was varied on the second target, and GdTbFeCoSi films having various compositions as shown below were prepared by simultaneous sputtering of the two sources.

$\{(Gd_{0.5}Tb_{0.5})_{0.21}(Fe_{0.9}Co_{0.1})_{0.79}\}_{0.95}Si_{0.05}$
$\{(Gd_{0.5}Tb_{0.5})_{0.21}(Fe_{0.9}Co_{0.1})_{0.79}\}_{0.9}Si_{0.1}$
$\{(Gd_{0.5}Tb_{0.5})_{0.21}(Fe_{0.9}Co_{0.1})_{0.79}\}_{0.85}Si_{0.15}$
$\{(Gd_{0.5}Tb_{0.5})_{0.21}(Fe_{0.9}Co_{0.1})_{0.79}\}_{0.8}Si_{0.2}$

Also, on the above first target of Fe, Si chips cut into small chips of 5 mm square were uniformly disposed, and the GdTbFeCoSi films having the following compositions were prepared according to the procedure as described above.

$\{(Ge_{0.5}Tb_{0.5})_{0.21}(Fe_{0.9}Co_{0.1})_{0.79}\}_{0.99}Si_{0.01}$
$\{(Gd_{0.5}Tb_{0.5})_{0.21}(Fe_{0.9}Co_{0.1})_{0.79}\}_{0.997}Si_{0.003}$

Among the above GdTbFeCoSi films, the film containing 30 atomic % or more of Si was a magnetic film having no easy magnetizable axis in the direction perpendicular to the film surface.

When the above GdTbFeCoSi films and GdTbFeCo films were placed in a thermostatic and humidistatic tank at 35° C., 90% for corrosion resistance tests, surface corrosions were observed after 4 to 5 days on the GdTbFeCo films but the corrosion resistance was found to be improved in the GdTbFeCoSi films as the increase of Si content.

Such improvements of corrosion resistance as described above can also be obtained when Si is added to the known GdTbFe in an atomic ratio of Si in the range from 0.1 atomic % to 30 atomic %. The following Example illustrates this point.

EXAMPLE 14

In a high frequency sputtering device, a plate glass of 3 inch square was used as the substrate and a first target having chips of Gd, Tb each of 5 mm square disposed uniformly on Fe of 4 inch in diameter and a second target composed of Si of 4 inch in diameter were employed; or alternatively on the first target of Fe, there were disposed uniformly chips of Gd, Tb each of 5 mm square and Si chips of 5 mm square. And, following the same process as described in Example 13, GdTbFeSi films having the following compositions were prepared.

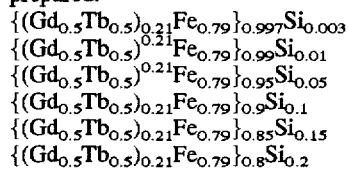

Figure 2:
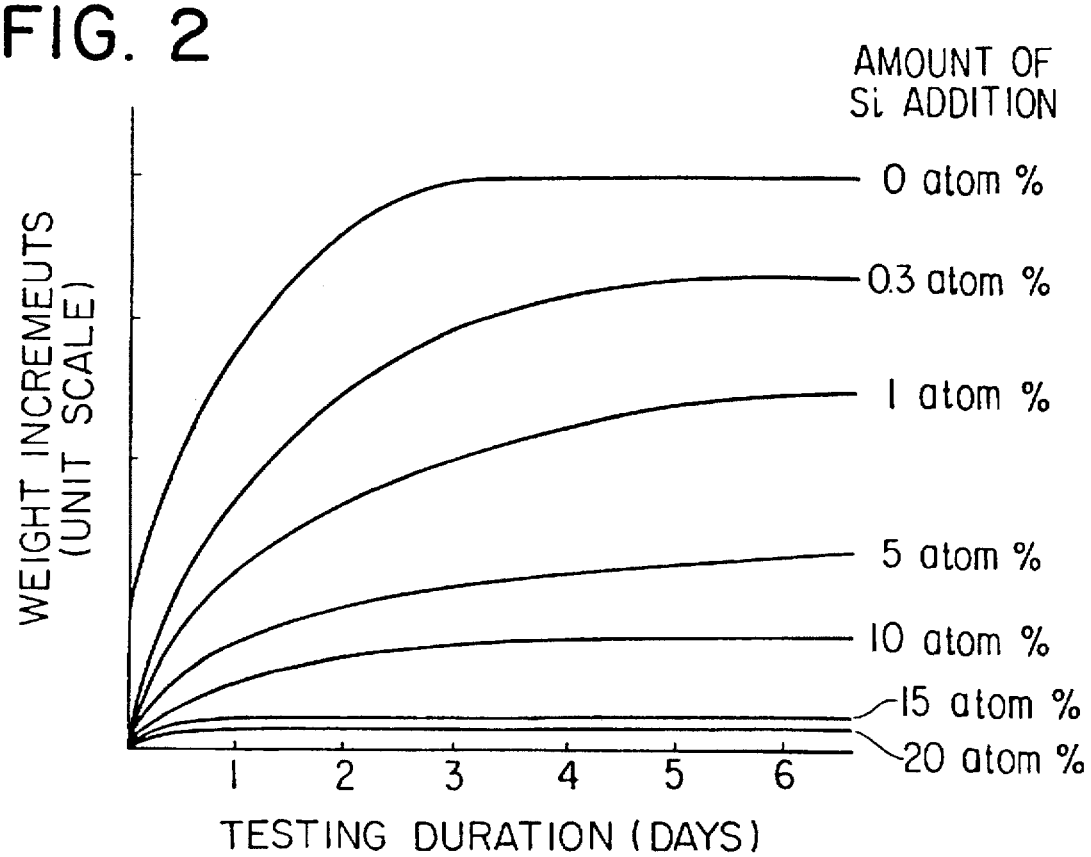
FIG. 2 shows the results of the corrosion test of GdTbFeSi according to the present invention.

The GdTbFeSi having the above constitutions were placed in a thermostatic and humidistatic tank at 35° C., 90% for corrosion resistance tests to obtain the results as shown in FIG. 2. FIG. 2 shows the weight increments per unit weight on the axis of ordinate, and the days, namely the time on the axis of abscissa, indicating the degree of corrosion is more progressed as the weight is increased. In the GdTbFe film containing no Si, the surface corrosion (oxidation) was observed after 2 to 3 days, while in GdTbFeSi films the changes in weight, namely the degree of oxidation was less as the increase in amount of Si, thus indicating improvement of corrosion resistance. Also, there was no change in magnetic characteristics (coercive force).

Among the GdTbFeSi films, the film containing 30 atomic % or more of Si was found to be a magnetic film having no easy magnetizable axis in the direction perpendicular to the film surface.

In laminating the magnetooptical recording medium according to the present invention on a substrate such as glasses, metals, plastics, etc. according to the sputtering vacuum vapor deposition method, there can be also provided a well known protective layer or a reflection preventive layer or a heat insulating layer which can also function as the protective layer, whereby corrosion resistance can be further enhanced. Also, as is well known in the art, corrosion resistance can of course be improved by employment of a "gas-sandwiched type" constitution having an inert gas sealed in its internal space.

Further, in the magnetooptical recording medium according to the present invention, Si and Cr may be added to the amorphous magnetic material or Si may be added together with other elements such as Al, whereby there can be obtained magnetic films excellent in corrosion resistance.

As described above, the magnetooptical recording medium according to the present invention, which is formed as a magnetic film of a quaternary amorphous alloy comprising Gd—Tb—Fe—Co, can be said to be an excellent magnetooptical recording medium which can give a great angle of Kerr rotation not attainable in the prior art, is capable of performing read-out at a good S/N ratio and also easy in film preparation.

Further, such a magnetooptical recording medium can be improved in corrosion resistance by further incoporating Si in an amount of Si atomic ratio ranging from 0.1 atomic % to 30 atomic % based on a total amount of an alloy.

What we claim is:

1. A magneto-optic recording medium comprising a substrate and an amorphous magnetic alloy film formed on said substrate, said film having an axis of easy magnetization in the direction perpendicular to the film surface, said alloy having a composition of the general formula:

$$(Gd_{1-z}Tb_z)_{1-y}(Fe_{1-x}Co_x)_y$$

wherein $0.05 \leq x \leq 0.4$ $0.5 \leq y \leq 0.9$ and $0.2 \leq z < 1$.

2. A magneto-optic recording medium according to claim 1, wherein $0.7 \leq y \leq 0.85$.

* * * * *

UNITED STATES PATENT AND TRADEMARK OFFICE
CERTIFICATE OF CORRECTION

PATENT NO. : 5,738,950

DATED : April 14, 1998

INVENTOR(S): HIROYOSHI KISHI, ET AL.

It is certified that error appears in the above-identified patent and that said Letters Patent is hereby corrected as shown below:

On the title page,

Item [56] FOREIGN PATENT DOCUMENTS:

"74843  6/1981  Japan." should be deleted (as redundant).

Item [56] OTHER PUBLICATIONS:

"Paper prepared for the 11th Research Conference of Japan Applied Magnetic Society; 11-4; Imamura; pp. 21-25, 1979 (With translation)." should read --Paper prepared for the 11th Research Conference of Japan Applied Magnetics Society; 11-4; Imamura; pp. 21-25, 1979 (With translation).--

"Taylor et al "Magnetic Anbotropy in Evaporated Amorphous Films of the ternary system $Gd_x (Fe_{1-y} Co_y)_{1-x}$" J. Appl. Phys., vol. 48, No. 1 (1977) pp. 358-361." should read --Taylor, et al., "Magnetic Anisotropy in Evaporated Amorphous Films of the ternary system $Gd_x (Fe_{1-y} Co_y)_{1-x}$," J. Appl. Phys., vol. 48, No. 1 (1977) pp. 358-361.--

COLUMN 1:

Line 18, "medium" should read --mediums--.

UNITED STATES PATENT AND TRADEMARK OFFICE
CERTIFICATE OF CORRECTION

PATENT NO. : 5,738,950

DATED : April 14, 1998

INVENTOR(S): HIROYOSHI KISHI, ET AL.

It is certified that error appears in the above-identified patent and that said Letters Patent is hereby corrected as shown below:

COLUMN 2:

Line 18, "feature" should read --features--.
   Line 46, "a" should read --the--.

COLUMN 3:

Line 25, "4 inch" should read --4 inches--.

COLUMN 4:

Line 32, "4 inch" should read --4 inches--.
   Line 33, "4 inch" should read --4 inches--.

COLUMN 5:

Line 5, "of 4 inch" should read --4 inches--.
   Line 6, "of 4 inch" should read --4 inches--.
   Line 13, "$\{(Gd_{0.5} Tb_{0.5})^{0.21}$" should read --$\{(Gd_{0.5} Tb_{0.5})_{0.21}$--.

UNITED STATES PATENT AND TRADEMARK OFFICE
CERTIFICATE OF CORRECTION

PATENT NO. : 5,738,950

DATED : April 14, 1998

INVENTOR(S) : HIROYOSHI KISHI, ET AL.

It is certified that error appears in the above-identified patent and that said Letters Patent is hereby corrected as shown below:

COLUMN 5:

Line 14, "$\{Gd_{0.5} Tb_{0.5}\}^{0.21}$" should read --$\{(Gd_{0.5} Tb_{0.5})_{0.21}$--.

Signed and Sealed this

Eleventh Day of May, 1999

Attest:

Attesting Officer

Q. TODD DICKINSON

Acting Commissioner of Patents and Trademarks